Aug. 30, 1966

G. H. LOCKWOOD 3,269,064

GRINDING MACHINE

Filed Jan. 17, 1964

GEORGE H. LOCKWOOD
INVENTOR

BY Norman S. Blodgett
ATTORNEY

Aug. 30, 1966   G. H. LOCKWOOD   3,269,064
GRINDING MACHINE
Filed Jan. 17, 1964
2 Sheets-Sheet 2
FIG. 3.
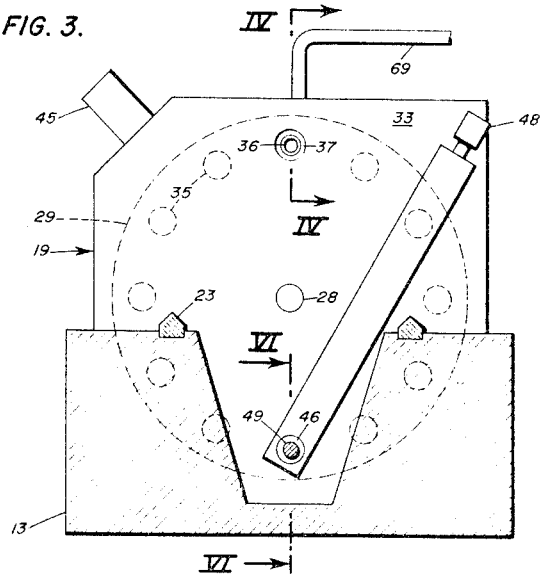
FIG. 4.
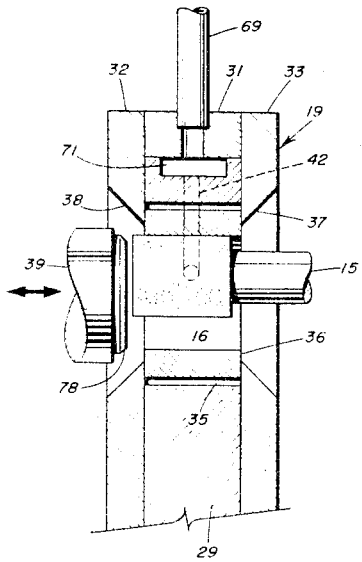
FIG. 5.
FIG. 6.
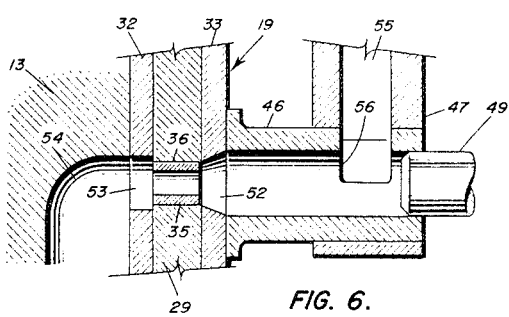
GEORGE H. LOCKWOOD
INVENTOR
BY *Norman S. Blodgett*
ATTORNEY United States Patent Office
3,269,064
Patented August 30, 1966

3,269,064
GRINDING MACHINE
George H. Lockwood, Worcester, Mass., assignor to The Heald Machine Company, Worcester, Mass., a corporation of Delaware
Filed Jan. 17, 1964, Ser. 338,333
7 Claims. (Cl. 51—48)

This invention relates to a grinding machine and, more particularly, to apparatus arranged to finish an internal surface of revolution of a small workpiece.

In the art of internal grinding, there has recently arisen a series of problems presented by the grinding of internal bores on small workpieces. Most of these problems have arisen in connection with grinding the internal bore of the race of the so-called "miniature ball bearing." The old and previously well-known methods of loading and supporting large ball bearing races do not work well when the races are quite small. A small ball bearing race may have an internal diameter in the order of the size of the lead of a pencil and it may have a very small wall thickness. This light weight workpiece cannot be handled by ordinary loading means because its weight is not sufficient to permit gravity to assist in the loading. Furthermore, during the grinding operation any attempt to support it with the pressure rolls and supporting shoes that have been used in the past may distort the workpiece and press it to a shape that is not circular; if the internal grinding operation is carried on while the workpiece is distorted in this manner, the internal surface will be very much out of round and, when the workpiece is removed from the grinding machine, it will spring back into its original condition. Furthermore, it is a well-known factor in the economics of machining that the time required to load a workpiece, i.e., the time between the removal of the finished workpiece and the time when the wheel begins work on a new workpiece, is wasted. That is to say, the considerable capital involved in the purchase of a grinding machine is lying idle while the wheel is not actually removing material from the workpiece. However, attempts to reduce the loading time with small workpieces have been relatively unsuccessful. In addition, the controlled force method of grinding permits the maximum amount of stock removal possible (short of destruction of the wheel) and, therefore, is a very desirable method of operation; however, it is difficult to support the workpiece when such forces are used without distorting the workpiece. These and other difficulties experienced with the prior art devices have been obviated in a novel manner by the present invention.

It is, therefore, an outstanding object of the invention to provide a grinding machine particularly adapted to the grinding of an internal surface of revolution on small workpieces.

Another object of this invention is the provision of a machine for grinding a surface of revolution of a thin-walled workpiece (such as the race of a miniature ball bearing) without distortion.

A further object of the present invention is the provision of a grinding machine in which small workpieces, such as the races of miniature ball bearings, may be loaded into the work zone quickly and accurately without danger of jamming or misplacement.

It is another object of the instant invention to provide a grinding machine for grinding the internal diameter of a thin-walled, light-weight workpiece, such as the race of a miniature ball bearing, wherein the machine is capable of quickly and accurately loading the workpiece into the work area and grinding the surface with a maximum force permissible without distortion of the workpiece.

It is a further object of the invention to provide a grinding machine for use in finishing the internal surface of the race of a miniature ball bearing or the like having a thin wall, wherein the operation takes place by the controlled force method at the greatest wheel pressure permitted by the wheel, this being accomplished without distortion of the wall of the workpiece.

A still further object of this invention is the provision of the grinding machine for small workpieces having concentric outside and inside diameters, wherein the workpiece is totally enclosed and confined during its introduction into and out of the workpiece area.

Another object of the invention is the provision of a grinding machine for workpieces which are rotated during grinding about the axis of a surface of revolution, wherein the speed of the workpiece relative to the abrasive wheel is accurately regulated.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which:

FIG. 3 is a transverse vertical sectional view of the machine taken on the line III—III of FIG. 2;

FIG. 4 is an enlarged sectional view of a portion of the invention taken on the line IV—IV of FIG. 3;

FIG. 5 is a vertical sectional view of a portion of the machine taken on the line V—V of FIG. 2; and FIG. 6 is a sectional view of the invention taken on the line VI—VI of FIG. 3.

Figures 1, 2:
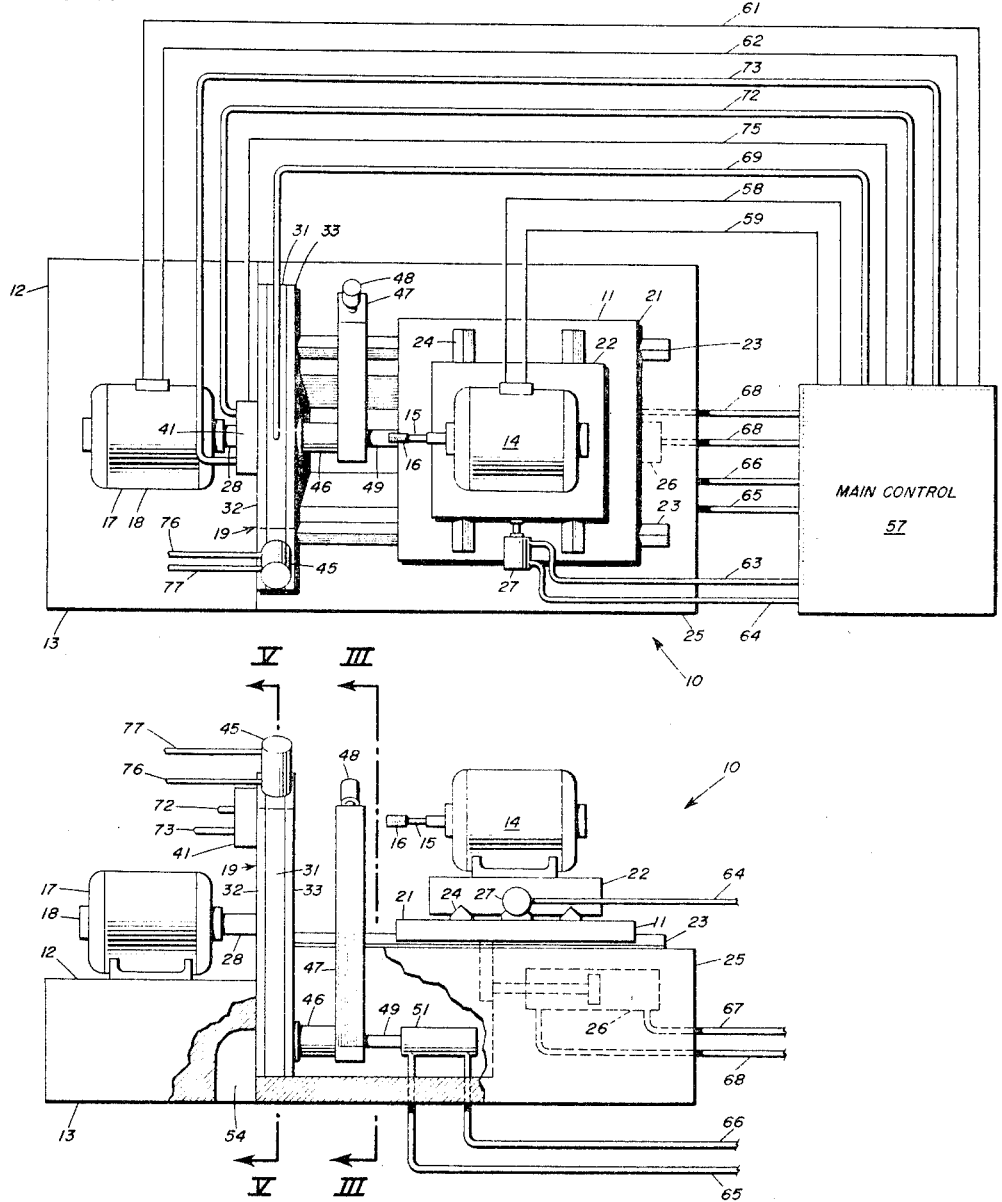
FIG. 1 is a plan view of a grinding machine embodying the principles of the present invention.
FIG. 2 is a side elevational view of the invention.

Referring first to FIGS. 1, 2, and 3, which best show the general features of the invention, the grinding machine, indicated generally by the reference numeral 10, consists of a base 13 on which are mounted a wheelhead table 11 and a workhead table 12. Mounted on the table 11 is a wheelhead 14 containing electric motor driving a spindle 15 having at its outer end an abrasive wheel 16. Mounted on the table 12 is a workhead 17 including an actuating motor 18 and a work support 19.

A wheelhead table 11 consists of a lower portion 21 and an upper portion 22 and is carried on a flat horizontal upper surface of an abutment 25 extending upwardly from the base 13. To this surface are fastened two parallel rails 23 which extend horizontally and longitudinally of the machine, i.e., parallel to axis of the spindle 15. The lower portion 21 is slidable longitudinally on these rails and carries the rest of the table and the wheelhead 14 with it. The lower portion 21 has a horizontal flat upper surface on which are mounted two parallel transverse rails 24 on which the upper portion 22 is slidably mounted. The movement of the lower portion 21 along its rails 23 takes place under the impetus of a hydraulic cylinder 26 mounted in the abutment 25 of the base 13, while the transverse movement of the upper portion 22 on its rails 24 takes place by means of a hydraulic cylinder 27 whose body is fastened to the upper surface of the lower portion 21.

Turning now to the workhead 12, the motor 17 is of the so-called "stepping" type whose shaft moves accurately through a predetermined angle in response to the introduction of a certain number of electrical pulses in a well-known manner. The shaft 28 extends beyond the edge of the workhead table 12 and has keyed to its outboard end a disc 29 which rotates with the shaft and whose outer circular periphery is concentric with the axis of the shaft. A disc 29 is supported in a circular aperture in a generally square plate 31, the aperture in the plate 31 being so formed that the disc 29 rotates smoothly within it. Engaging the disc 29 and the plate 31 on one side is a supporting plate 32 whose other side engages a vertical face of the workhead table 12. A disc 29 and the plate 31 are supported on the sides facing the wheelhead 14 by a vertical plate 32 which extends upwardly from the base 13.

The disc 29 is provided with a plurality of bores 35. These bores are all very accurately formed with the same size; their axes are all parallel to one another and parallel to the axis of the shaft 28. The axes of the bores are contained on an imaginary circle concentric with the shaft 28 and are equally spaced about the shaft at angles to one another and to the axis of the shaft, which angle is very accurately developed during the machining of the bores. Twelve bores are shown in the illustrations but, of course, any desired number may be used.

FIG. 4 shows quite clearly the relationship of one of the bores 35 to the rest of the machine. As is evident in the drawing, a workpiece 36 is shown as the race of a ball bearing and is located in the bore 35. A diameter of the bore is slightly larger than the outside diameter of the workpiece. Furthermore, the thickness of the disc 29 is selected so as to be practically the same as the length of the workpiece. As is evident in the drawing, the opposed faces of the plates 32 and 33 embrace the opposite sides of the disk 29 and the workpiece 36 and hold the workpiece in place in the bore. The condition pictured in FIG. 4 is that which exists when the bore 35 is situated at the upper part of the work support, at which position the plate 33 is provided with a conical bore 37 (see FIG. 3). The bore 37 is frusto-conical with its large end at the side of the plate 33 which faces the wheelhead and its small end at the side of the plate which lies against the workpiece and against the disc 29. The small diameter of the bore 37 is larger than the inside diameter of the workpiece 36 and smaller than the outside diameter, so that a thin knife edge lies against the end of the workpiece and holds it in place. The abrasive wheel 16 enters and leaves the bore of the workpiece through this bore 37. A similar tapered bore 38 passes through the plate 32 in exact alignment with the bore 37 at the upper part of the workpiece support. In a similar manner, the smaller end of the bore 38 is adjacent the workpiece 36 and the diameters are the same, so that a considerable portion of the end of the workpiece is exposed. A bore 38 is provided for the admission through the workpiece of a plug gauge 39 forming a part of a gauging apparatus 41 (see FIGS. 1 and 2). Entering each of the bores 35 at a point midway between the side surfaces of the disc 29 is a passage 42; this passage is very small in diameter and is provided with a small shallow recess surrounding its opening into the bore 35. When the bore 35 is in its uppermost position in alignment with the apertures 37 and 38, the opening of the passage 42 into the bore 35 lies on a horizontal plane passing through the axis of the bore 35. In grinding parlance, the passage is located at "three o'clock" and lies on the opposite side of the wall of the workpiece 36 from the point contacted by the wheel 16 in performing the grinding operation.

FIG. 5 shows the appearance of the disc 29 as observed from the direction of the wheelhead and showing the supporting plate 31 surrounding it. Located adjacent each of the bores 35 and accurately located relative thereto is a notch 43. Extending through a passage in the plate 31 generally radially of the disc 29 is a dog 44 which is operated by a hydraulic cylinder 45. The cylinder 45 is mounted at the forward, uppermost corner of the plates 31, 32 and 33, as is evident in FIGS. 1, 2 and 3. The disc is to be rotated clockwise, as observed in FIG. 5, and each of the notches 43 is made up of two straight sides, one of which is exactly radial and the other which is inclined substantially to the radial surface. The radial surface faces in the direction of rotation and is intended to provide an accurate surface for the dog 44 to engage to assist in locating each of the bores 35 in an accurate location relative to the bores 37 and 38 and the abrasive wheel 16. At the lower parts of the plates 32 and 33 are provided with aligned apertures similar in nature to the apertures 37 and 38 at the upper part of the plates; these lower apertures are located so that, when a bore 35 is in alignment with the bores 37 and 38 at the upper portion, another bore 35 is aligned with these lower bores for removal of a finished workpiece and introduction of a new unfinished workpiece. Fastened to the outer surface of the plate 33 and located in alignment with the lower aperture is a feed tube 46 to the side of which is attached a feed chute 47. This feed chute extends upwardly and rearwardly to avoid the operating portions of the machine and its upper end is located well above the machine to permit the operator to introduce unfinished workpieces at its upper end. The chute has a passage 55 (see FIG. 6) extending along its length and the workpieces slide downwardly in this passage, being urged in that direction by a weight 48 located at the upper end. Located coaxially of the feed tube 46 and adapted to enter its bore is a plunger 49 which is actuated by a hydraulic cylinder 51.

FIG. 6 shows very clearly the relationship between the elements in this portion of the machine. The aperture 52 in the plate 33 is slightly tapered and is aligned with the aperture 35 in its lower position in the plate 31. Its smaller diameter is adjacent the disc 29 and is approximately the same diameter as the bore 35. The plate 32, on the other hand, is provided with an aperture 53 which is slightly larger than the bore 35. The workhead table 12 and the base 13 which backs up the plate 32 is provided with a chute 54 which receives a finished workpiece as it is discharged from the bore 35 through the aperture 53. The taper in the aperture 52 is exaggerated in the drawing and the bore in the feed tube 48 is of a size to blend smoothly with the larger outer diameter of this aperture. The feed tube 46 is cut away to provide an opening 56 which constitutes an extension of the passage 55 in the feed chute 47. To show the construction more clearly, the passage 55 and the bore in the feed tube 46 are shown empty, but during operation they would normally be full of workpieces.

A main control, indicated by the reference numeral 57, contains the necessary relays and valves to connect the various elements of the machine to hydraulic and electrical sources (not shown). The wheelhead 14 receives its energizing electrical current through lines 58 and 59 which are connected to the main control 57. Similarly, the actuating motor 18 is energized by means of the lines 61 and 62 connected to the main control. The cylinder 27 receives hydraulic fluid through the conduits 63 and 64, while the loading cylinder 51 receives hydraulic fluid through the conduits 65 and 66. The cylinder 26 which serves to reciprocate the wheelhead 14 is connected to the main control by conduits 67 and 68. The hydrostatic fluid arrives at the passages 42 by means of a conduit 69 which originates in the main control 57 and terminates on the inner surface of the plate 31 adjacent the periphery of the disc 29. The disc is provided with a series of pockets 71 (see FIG. 5), each of the passages 42 being connected to one of these pockets. The gauging apparatus 41 is also connected to the main control by hydraulic conduits 72 and 73. Furthermore, it includes a switch which is connected to the main control by a line 75 which advises the main control when the bore in the workpiece has reached a desired size.

The operation of the invention will now be readily understood in view of the above description. Let us assume that a workpiece 36 is already in place in one of the bores 35 in the disc 29 and that this particular bore 35 is located at the top so that its pocket 71 encompasses the opening of the hydraulic conduit 69. The plates 32 and 33 lie on either side of the disc 29 and of the plate 31 which surrounds and supports the disc. The openings 37 and 38 are exactly aligned with the bore 35 and the lips formed by the inner edges of the plates 32 and 33 surrounding the apertures 37 and 38 embrace the ends of the workpiece 36 but leave a substantial portion exposed, particularly the portions surrounding the inner bore which is to be ground. Hydraulic oil originating in the main control 57 flows through the conduit 69 into the pocket 71 and along the passage 42 into the space surrounding the workpiece 36. This serves to float the workpiece, since the bore 35 is only slightly larger than the outside diameter of the workpiece 36, the workpiece will float on a film of oil. The wheelhead 14, carrying its spindle 15 and its abrasive wheel 16, is advanced longitudinally toward the opening 37; it does this under the impetus of the cylinder 26 whose motion is controlled by the main control 57 through the conduits 67 and 68. The lower portion 21 of the table 11 slides along the rails 23 and, eventually, the abrasive wheel 16 resides in the bore of the workpiece. At that time, the main control 57 operates the cylinder 27 through the conduits 63 and 64 to cause the upper portion 22 of the table 11 to slide along the rails 24, so that the wheel is moved transversely of the axis of the workpiece. In the preferred embodiment, the machine is operated as a "controlled-force" grinding machine rather than as a "feed-rate" machine; this means that the wheel advances into the work in an unrestricted manner until the force between the wheel 16 and the surface of the workpiece to be finished reaches a predetermined value which is selected to be very close to (but, nevertheless, less than) the force required to cause failure of the wheel 16. In this way, maximum stock removal takes place and the rate of feed is uninhibited. The manner in which this is accomplished is more completely described in the patent of Hahn No. 2,680,941 issued June 15, 1954. The wheel is reciprocated in the bore (in the manner usually used in internal grinding) by means of the cylinder 26, again operating from the main control 57 through the conduits 67 and 68. The main control, incidentally, provides for the long motions of the wheelhead in bringing it to and from the bore and also brings about the short reciprocations which take place during grinding. As the grinding operation progresses, the pressure of the wheel against the workpiece 36 is resisted by the film of oil arriving in the space between the workpiece and the bore 35 from the passage 42. As a matter of fact, as the wheel engages the workpiece 36, the friction serves to rotate it in this film of oil; the viscosity of the oil, however, prevents the surface speed of the workpiece from reaching that of the wheel by a substantial amount. At the same time, the oil arriving from the main control 57 through the conduits 72 and 73 causes the gauge 39 to be moved toward and from the workpiece by the gauging apparatus 41 which includes a small hydraulic cylinder. Eventually, as the grinding operation progresses and the gauge 39 repeatedly strikes the end of the workpiece 36, the bore in the workpiece will reach a large enough dimension so that the gauge may enter. When it does not, a switch in the gauging apparatus 41 will be closed and an electric signal will be passed through the line 75 to the main control 57 which will then terminate the grinding cycle. When this is done, the cylinder 27 will be energized by the main control 57 through the conduits 63 and 64 and will retract the wheelhead 14 and the abrasive wheel 16 from the surface of the workpiece. At the same time, the main control will operate through the conduits 67 and 68 to cause the cylinder 26 to retract the wheelhead longitudinally. Once it has served its function of setting the termination of the cycle in motion, the gauge 39 is retracted by the gauging apparatus 41. It should be noted that the main control 57 permits electrical power to pass through the lines 58 and 59 to keep the wheelhead 14 revolving at all times. The actuating motor 18 only operates intermittently, however and, when the abrasive wheel 16 has been removed from both the workpiece bore and the aperture 37 in the plate 33 (and, therefore, is completely clear of the workhead), electrical pulses are sent through the lines 61 and 62 to operate the stepping motor 18 and to rotate the shaft 28. Rotation of the shaft through a predetermined angle, i.e., the angle between two adjacent bores 35, will remove the bore 35 just described and its finished workpiece 36 in a clockwise direction and bring a new bore 35 and an unfinished workpiece into alignment with the apertures 37 and 38 in the plates 32 and 33. At the same time, a finished workpiece and bore 35 will arrive in alignment with the apertures 52 and 53 in the plates 32 and 33. When this position is reached, the indexing is stopped completely, a hydraulic signal arrives at the cylinder 45 through conduits 76 and 77 which are connected to the main control 57 and the plunger 44 is moved inwardly until it engages in one of the notches 43 and presents a definite locating point for the disc 29. The positive location of the disc 29 takes place by the engagement of the dog 44 in the notch 43, the actuating motor 18 being constructed in such a way as to present a certain degree of torque until that dog is pressed completely against the radial surface of the notch 43 so that positive location takes place.

At this time (while a new workpiece is being ground) a signal from the main control 57 arrives at the cylinder 51 through the conduits 65 and 66 which causes the plunger 49 to move into the bore in the feed tube 48. Eventually, it strikes the lowermost workpiece which has arrived from the passage 55 in the feed chute 47 and through the aperture 56; the plunger pushes the column of workpieces in the axial direction a distance equal to its length. This will cause the finished workpiece which resides in the bore 35 to pass axially through the aperture 53 in the plate 32 so that it falls downwardly through the chute 54 formed in the base 13. A receptacle catches each such finished workpiece. The new workpiece has been pushed (by those workpieces following it) from the bore of the feed tube 48 through the aperture 52 in the plate 33 into the bore 35 where it is ready to be rotated with the plate 29 and, eventually, to reach the grinding position at 12 o'clock. The feed chute 47 and the bore of the feed tube 48 are always full of workpieces, the weight 48 serving to press them downwardly so that they are ready to be engaged by the plunger 49 and move along the bore in the feed tube 46. The slight taper in the aperture 52 in the plate 33 facilitates the introduction of the workpiece into the bore 35 which, as has been stated above, fits the outside surface of the workpiece rather closely.

It should be noted that the controlled-pressure oil pressure furnished to the cylinder 27 by the main control 57 through the conduit 64 appears at the outside of the piston which acts to move the upper portion 22 of the wheelhead table 11 along the rails 24. Since this oil tends to push the wheelhead transversely and since the only factor which resists this movement is the pressure of the abrasive wheel 16 against the bore of the workpiece 36, it can be seen that the force with which grinding takes place is controlled by the pressure in the outside of the piston in the cylinder 27. When this oil pressure is maintained at a constant value during grinding, a constant high rate of material removal is brought about. Since the size of the bore is determined by the use of a gauge 39, the apparatus is greatly simplified because there is no need for conventional positive feeding apparatus. The foil film between the bore 35 and the workpiece 36 is capable of being compressed slightly as the grinding takes place; the entire apparatus will be "floating" after a fashion, because there is no positive location for the wheelhead or the abrasive wheel or of the workpiece itself. The only factor that is constant from workpiece to workpiece is the size of the gauge 39. The gauge is provided with a small tapered portion 78 and is capable of sidewise motion; as the gauge strikes the end of the workpiece and attempts to enter its internal bore, it is capable of sliding slightly sideways to center itself on the workpiece, despite the fact that the workpiece is floating and may not originally be aligned with the gauge. This also takes care of the situation that arises (as it often does in practice) when the outside diameter of the workpiece has a considerably larger tolerance on diameter than the inside bore. This means that the oil film thickness varies from workpiece to workpiece and the center of the workpiece will also vary, so that the gauge must be capable of moving laterally as it attempts to enter the workpiece. It should be noted in passing that, even though the abrasive wheel 16 tries to bring the workpiece 36 up to its own peripheral speed, this action is resisted by the dragging action of the oil film on the outside diameter of the workpiece, the viscosity of the oil restricting the speed of the workpiece to a value substantially below that of the wheel. It would, of course, be undesirable to have the workpiece reach the exact peripheral speed of the abrasive wheel 16, since at that time, grinding would be reduced to zero. Similarly, it is not desirable to have the workpiece 36 standing still, since the abrasive wheel would grind only one spot in the bore. A suitable balance of friction forces, therefore, is necessary in this situation and the selection of the proper factors including the viscosity of the oil is something that will vary from workpiece to workpiece and job to job.

In the preferred embodiment, the clearance between the workpiece and the surfaces of the bore 35 would be from .001 to .003 inch. Furthermore, this invention contemplates end clearance of approximately .0005 to .001 inch; that is to say, the total clearance between the surfaces of the plates 32 and 33 and their contact with the ends of the workpiece 35 will be in this range.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for use with a workpiece having outer and inner surfaces of revolution, comprising
   (a) a work support having a bore which is only slightly larger than the outer surface of the workpiece and in which the workpiece resides,
   (b) means restricting the workpiece to the bore during grinding, and
   (c) means providing fluid under pressure to the space between the workpiece and the bore, the bore being located in a plate member which is supported by two plates, one on each side, the plates being provided with apertures which are adapted to be axially aligned with the bore.

2. A grinding machine as recited in claim 1, wherein the apertures are tapered, with their smaller ends adjacent the plate member, for the admission to the workpiece of an abrasive wheel and a gage.

3. A grinding machine for use with a workpiece having outer and inner surfaces of revolution, comprising
   (a) a work support including a disc in which a plurality of bores is located at accurately-defined spacing on an imaginary circle concentric to the axis of the disc, the disc being rotatable about its axis, each bore being only slightly larger than the outer surface of the workpiece and in which the workpiece resides, the disc being mounted on a shaft which is rotated through accurately-determined angles to bring the bores successively to a grinding position, the rotation serving at the same time to bring another of the bores to a loading position, each bore being provided with a passage leading to the outer periphery of the disc, the work support also including a fixing plate having a circular aperture in which the disc is rotatably mounted, a source of pressure fluid being connected to a point in the circular aperture where it has access to successive passages leading to bores as the disc is rotated,
   (b) means restricting the workpiece of the bore during grinding, and
   (c) means providing fluid under pressure to the space between the workpiece and the bore.

4. A grinding machine for use with a workpiece having outer and inner surfaces of revolution, comprising
   (a) a work support including a disc in which a plurality of bores are located at accurately-defined spacing on an imaginary circle concentric to the axis of the disc, the disc being mounted on a shaft which is rotated through accurately-determined angles to bring the bores successively to a grinding position, the rotation serving at the same time to bring another of the bores to a loading position, the disc being sandwiched between two support plates, the plates having aligned apertures at the grinding position and aligned apertures at the loading position, a feed tube mounted over the aperture in one of the support plates at the loading station with its bore aligned with the aperture, a feed chute connected to the outer end of the feed tube and having a passage extending at a right angle to the axis of the feed tube, and a plunger adapted to slide in the bore of the feed tube to push successive workpieces axially therealong as they leave the feed chute and enter the feed tube,
   (b) means restricting the workpiece to the bore during grinding, and
   (c) means providing fluid under pressure to the space between the workpiece and the bore.

5. A grinding machine for use with an annular workpiece, comprising
   (a) a work support having a bore which is only slightly larger than the workpiece and in which the workpiece resides during grinding,
   (b) means providing a film of fluid between the workpiece and the bore during grinding,
   (c) a wheelhead adapted to carry an abrasive wheel,
   (d) means pressing the wheel against the workpiece in a controlled-force pattern during grinding, the feed rate being uncontrolled, and
   (e) a gage means provided to control the progress of the grinding operation, the work support being sandwiched between two support plates, each of the plates having an aperture adapted to be aligned with the bore and having a diameter smaller than the work support bore and larger than the bore in the workpiece, one of the apertures admitting the abrasive wheel to the workpiece and the other of the apertures granting the gage access to the workpiece.

6. A grinding machine as recited in claim 5, wherein means is provided to slide the work support between the support plate to carry the bore from a grinding position where it is aligned with the said apertures to a loading position where it is aligned with another aperture in each of the support plates.

7. A grinding machine as recited in claim 6, wherein commutation means is provided to provide the film of fluid only when the bore is in the grinding position.

References Cited by the Examiner
UNITED STATES PATENTS

| | | |
|---|---|---|
| 1,779,823 | 10/1930 | Norton. |
| 2,345,308 | 3/1944 | Wallace _____ 51—236 X |
| 2,646,652 | 7/1953 | Blood _____ 51—103 |
| 2,663,977 | 12/1953 | Gerard et al. _____ 51—100 |
| 2,680,941 | 6/1954 | Hahn _____ 51—50 X |
| 2,927,406 | 3/1960 | Terp _____ 51—103 |

LESTER M. SWINGLE, *Primary Examiner.*